United States Patent
Holton

(10) Patent No.: US 6,621,561 B2
(45) Date of Patent: Sep. 16, 2003

(54) DOPPLER ROTATIONAL VELOCITY SENSOR

(75) Inventor: Carvel E. Holton, Blacksburg, VA (US)

(73) Assignee: Virginia Tech Intellectual Properties, Blacksburg, VA (US)

( * ) Notice: Subject to any disclaimer, the term of this patent is extended or adjusted under 35 U.S.C. 154(b) by 0 days.

(21) Appl. No.: 09/957,381

(22) Filed: Sep. 20, 2001

(65) Prior Publication Data

US 2002/0075475 A1 Jun. 20, 2002

Related U.S. Application Data

(60) Provisional application No. 60/234,369, filed on Sep. 22, 2000.

(51) Int. Cl.[7] ............................................. G01P 3/36
(52) U.S. Cl. ................................. 356/28.5; 356/26
(58) Field of Search .................................. 356/28, 28.5

(56) References Cited

U.S. PATENT DOCUMENTS

| | | | | |
|---|---|---|---|---|
| 3,895,872 A | * | 7/1975 | Dandliker et al. | 356/28 |
| 3,966,324 A | * | 6/1976 | Iten | 356/28 |
| 4,551,017 A | * | 11/1985 | Mannava et al. | 356/28.5 |
| 4,551,018 A | * | 11/1985 | Mannava et al. | 356/28.5 |
| 5,159,406 A | | 10/1992 | Adler et al. | 356/349 |
| 5,517,306 A | | 5/1996 | Yakubovich et al. | 356/351 |
| 5,872,628 A | * | 2/1999 | Erskine | 356/28.5 |
| 6,323,949 B1 | * | 11/2001 | Lading et al. | 356/28.5 |

FOREIGN PATENT DOCUMENTS

| | | |
|---|---|---|
| WO | WO 96/02009 | 1/1996 |

OTHER PUBLICATIONS

M.J. Parker, C. Holton, "Design for a Comprehensive Optical Atmospheric Monitoring System", 11th Joint Conference on the Applications of Air Pollution Meteorology, American Meteorological Society/Air and Waste Management Association, Long Beach, CA Jan. 2000.

C. Holton, M.J. Parker, SPIE Proceedings, "Fiber Optics in Meteorological Instrumentation Suites", vol. 3860–13, Sep. 1999 pp. 131–142.

F.J. Arregui, Y. Liu, K. Lenahan, C. Holton, I.R. Matias, R.O. Claus, SPIE Proceedings, "Optical Fiber Humidity Sensor Formed by the Ionic Self–Assembly Monolayer Process", vol. 3670, Mar. 1999.

F.J. Arregui, I.R. Matias, Y. Liu, K. Lenahan, R.O. Claus, "Optical Fiber Nanofabry–Perot Formed by the Ionic Self–Assembly Monolayer Process", Sensors and Actuators B, Chemical, Dec. 1998.

(List continued on next page.)

*Primary Examiner*—Stephen C. Buczinski
(74) *Attorney, Agent, or Firm*—Cantor, Colburn, LLP

(57) ABSTRACT

The disclosed invention concept utilizes a homodyne/heterodyne interferometer technique in a modified lidar in such a manner as to sense the rotational velocity magnitude and sense of a rotating (or "spinning") object. Sensing is accomplished in assessing either the Doppler bandwidth of a single axis system or in sensing the frequency separation of Doppler spectrums in a "two" axis system. The technique is unique in that the Doppler bandwidth is linearly proportional to rotational velocity and independent of intercept position in the rotation plane. The technique as disclosed is based on optical fiber lidar techniques, but can be implemented in free-space optics as well. The disclosed invention therefore comprises both a technique for utilization of an optical fiber lidar and a new arrangement of lidar elements. Compact and cost effective, standoff rotation velocity sensors and systems can be fabricated with this technique.

11 Claims, 6 Drawing Sheets

OTHER PUBLICATIONS

F.J. Arregui, Y. Liu, K. Lenahan, C. Holton, I.R. Matias, R.O. Claus, "Optical Fiber Humidity Sensor Formed by the Ionic Self–Assembly Monolayer Process", Optical Fibers Sensors Conference, Komju Korea, Apr. 1999.

C. Holton, P. Rogers, L. Beex, S. Sankaran, "Development and Testing of a Multi–Function Optical Fiber Lidar", 12th Annual Research Program, Apr. 1999.

G.A. Ball, C. Holton, G. Hull–Allen, W.W. Morey "60 mW 1.5. um Single–Frequency Low –Noise Fiber Laser MOPA", Photonics Technology Letters, Feb. 1994.

G.A. Ball, G. Hull–Allen, C. Holton, W.W. Morey, "Low Noise Single Frequency Linear Fibre Laser", Electronic Letters, vol. 29, No. 18, Sep. 1993.

Prototype Handbook, Optical Air Data System (OADS), Reports, Proposals, UTOS, 1987–1989.

R. Frehlich, S.M. Hannon, S.W. Henderson, Applied Optics, "Coherent Doppler Lidar Measurements of Winds in the Weak Signal Regime", vol. 36, No. 15, May 1997.

PCT International Search Report, Date of Mailing: May 29, 2002 for International Application No. PCT/US01/29866, International Filing Date: Sep. 21, 2001.

* cited by examiner

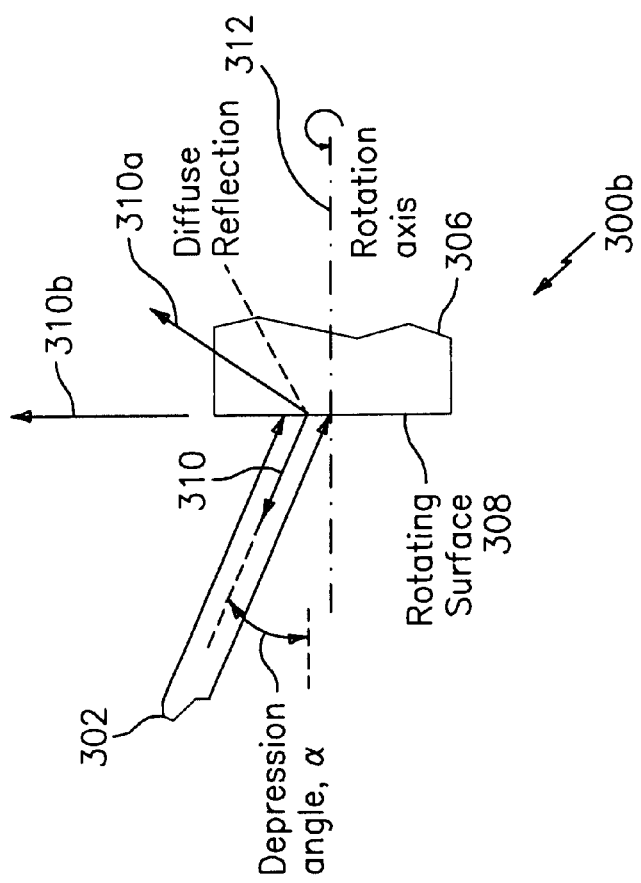
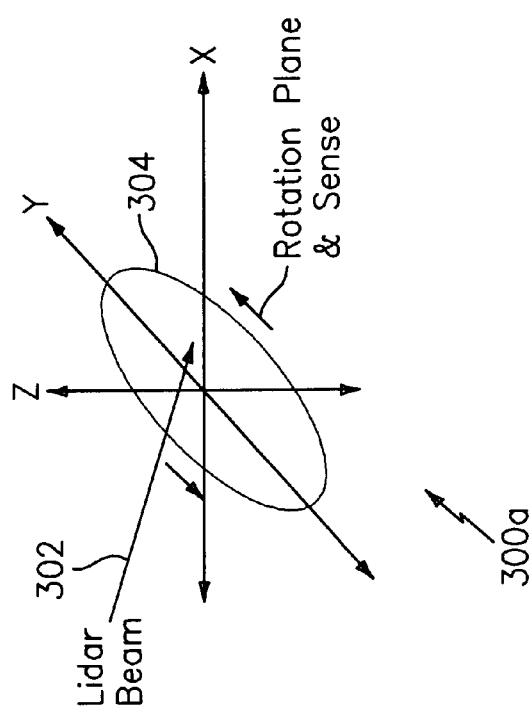
FIG. 3B
FIG. 3A

DOPPLER ROTATIONAL VELOCITY SENSOR

RELATED APPLICATIONS

This application claims the benefit of U.S. Provisional Patent Application No. 60/234,369, filed Sep. 22, 2000, which is incorporated herein.

TECHNICAL FIELD

This disclosure relates to the use of optical lidar in measuring the rotational velocity of an object.

BACKGROUND

Present technology in measuring the rotational velocity of an object often requires contact with the surface of the object, or is restricted in the size of the rotating plane, measurement geometry or linearity. Applications for coherent Doppler lidars include velocity sensing applications (platforms and objects), volumetric/fluidic flow sensing, vibration monitoring, range to target and other related stand-off sensing applications such as rotational velocity. A Doppler lidar detects the Doppler frequency shift imposed on coherent light scattered from a moving target by mixing the scattered (or reflected), frequency shifted light with a reference beam of light (local oscillator) which is not shifted in frequency on the detector. As in the mixer of a conventional radio set, a difference frequency results from this mixing process which is proportional to the velocity of the scattering target. It is the Doppler frequency shift imposed on the light scattered from the target that provides the mechanism used for velocity detection. The reference beam can be either derived from the transmit beam (homodyne operation) or derived from another stable coherent source (heterodyne operation). By measuring the Doppler shift from three (or more) angularly separated lidar beams brought to a common focus point on an unconstrained, rotating object, a complete vector velocity can be computed from the center frequencies of the Doppler spectrums obtained, along with statistical velocity information. The optical assembly required to do this however is complicated.

SUMMARY OF THE INVENTION

The disclosed invention concept utilizes a homodyne/heterodyne interferometer technique in a modified lidar in such a manner as to sense the rotational velocity of a rotating (or "spinning") object in either the Doppler bandwidth of a single axis system or in the differential spectrum of a "two" axis system. The technique as disclosed is based on optical fiber lidar techniques, but can be implemented in free-space optics as well. The disclosed invention therefore comprises both a technique for utilization The disclosed technique can be implemented for instance to measure the rotational velocity of a high velocity projectile in free space or a miniature shaft. Resolution is limited by the bandwidth of the lidar source and the focusing ability of the optical aperture. The disclosed technique allows for optical isolation of the sensor from the target surface and environment. Extremely high rotational velocities may be sensed with the disclosed technique.

The disclosed invention senses the roatational velocity of a rotating objected constrained to a single axis of rotation. In this case, with the appropriate measurement geometry, both the Doppler center frequency and bandwidth are proportional to velocity. As will be shown, the center frequency depends on the radial position of the detection beam(s). The bandwidth of the Doppler spectrum does not. Hence the Doppler bandwidth may be processed to implement a sensor which can interrogate a rotating surface at a substantial standoff distance, whereby the interrogation site is rotationally and positionally invariant. Properly arranged, the disclosed system can determine translational velocity and rotational velocity simultaneously. Velocities well into the hypersonic range are detectable with the disclosed concepts.

EXPLANATION OF THE DRAWINGS

FIG. 3A is a diagrammatic representation of a lidar beam intercept geometry;

FIG. 3B is a diagrammatic representation of an orthogonal view of the lidar beam intercept geometry of FIG. 3A;

DETAILED DESCRIPTION OF THE INVENTION

Figure 1:
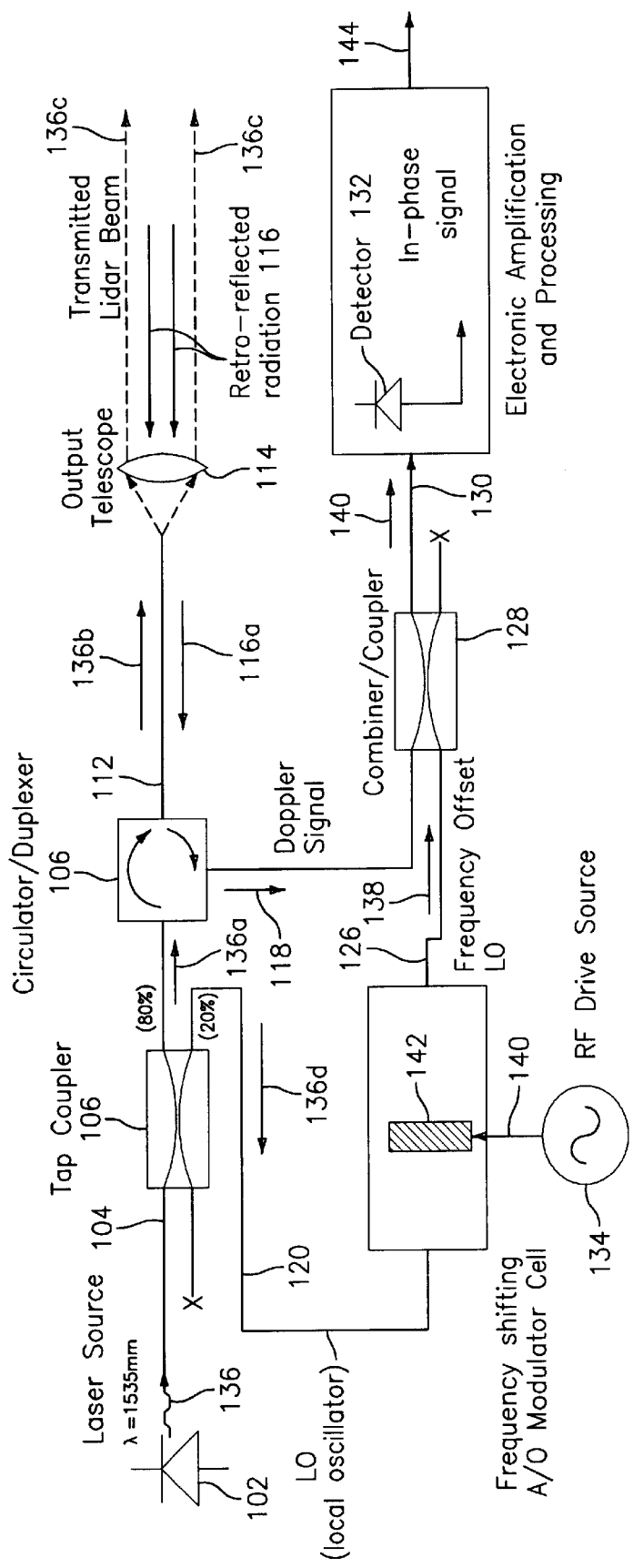
FIG. 1 is a schematic representation of an offset homodyne optical fiber lidar.
Figure 2:
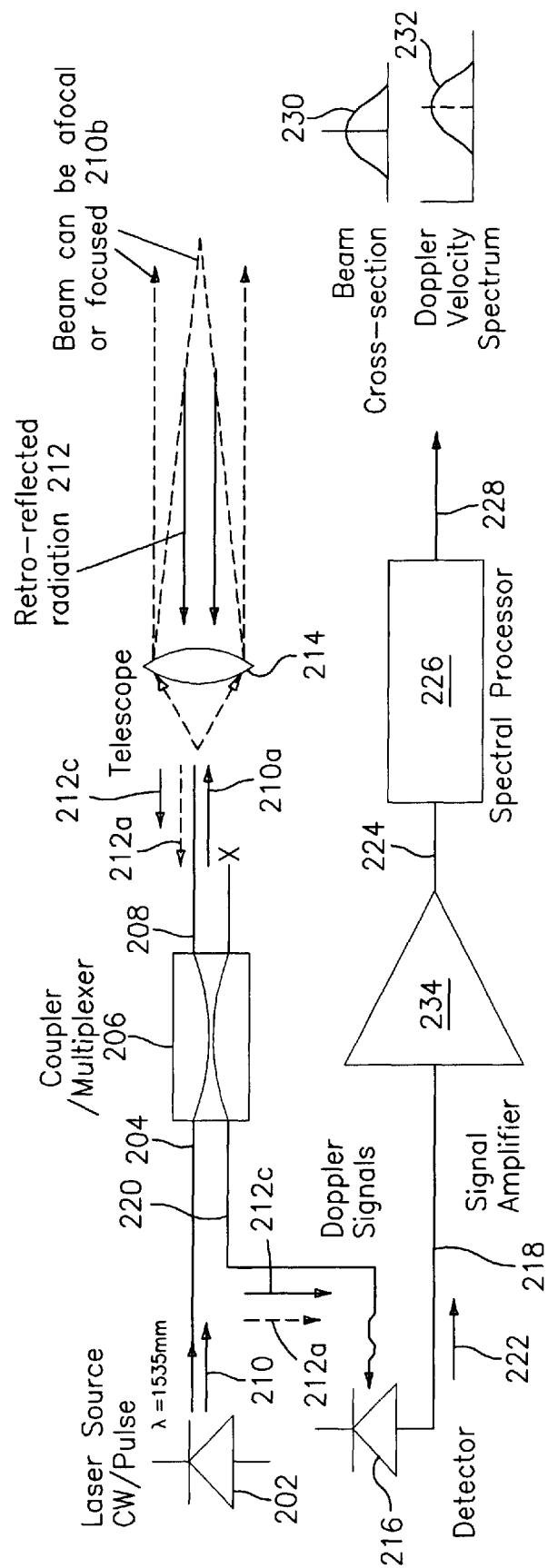
FIG. 2 is a schematic representation of a homodyne optical fiber lidar.

In general, fiber lidar systems utilize the same optical functions to perform the lidar mission as free-space systems, except the optical elemerus are created by guided-wave optics (e.g. optical fiber devices). The laser source is generally a combination of a suitable solid state, DFB laser diode and one or more cascaded optical fiber amplifiers of the appropriate wavelength, although fiber or free-space lasers could be used as the source elements. For the most part, the amplifier of choice is the EDFA operating at a wavelength of 1.54 $\mu$m. In the simplest form of an offset homodyne fiber lidar 100 shown in FIG. 1, the output 136 of the laser amplifier/source combination 102 is fed thru a duplex element 110 to the end of a fiber 104, 108, 112 located at the focal point of an appropriate lens or telescope 114. In FIG. 1, the local oscillator (LO) signal 136*d*, is split off by a tap coupler 106 prior to the duplex element 110 to be offset shifted in frequency by the A/O modulator 134, 140, 142. The frequency shifted LO signal 138 is then recombined at combiner/coupler 128 with the returning Doppler frequency-shifted signal 116, 116*a*, 118 in a combining coupler 128 providing thereby a Doppler optical signal 140 as shown in FIG. 1. The main beam 136*a*, 136*b*, 136*c* is transmitted to the object (not shown) through the lens 114 which also couples the backscattered (or reflected) light 116 into the return fiber path 116*a* through the duplex element 110. The two signals 118, 138 then mix due to the non-linear superposition of the electric field vectors on the detector 132 to generate a signal 144 at the Doppler difference frequency. Doppler frequency is then proportional to the vector velocity component of the object in the axis of the beam (collinear with the beam 136*c*). Electronic processing at 132 of the signal 140 is then used to produce a Doppler velocity spectrum 142. The offset frequency must be greater than the highest Doppler velocity component. System electronic bandwidth must be twice this frequency to accept both positive and negative Doppler velocity. If the velocity spread function of the sensed object does not contain a bi-directional velocity distribution, the optical circuit 200 of FIG. 2 without the A/O cell may be utilized. In the circuit of FIG. 2, the LO signal 212c is taken from the Fresnel reflection of the outgoing radiation 210a reflected from the end of the optical fiber 208 itself, greatly simplifying the optical circuit and removing birefringent optical fiber effects from the detection efficiency considerations. In FIG. 2, detector 216 is receptive of the Doppler shifted radiation 212a and the aforesaid Fresnel reflection of the beam of light and is operative thereby to provide as output a signal 222 indicative of the rotational velocity of the target. The detector 216 is receptive of the Doppler shifted radiation 212a and the LO signal 212c, and is operative thereby to also provide as output a signal 222 indicative of the rotational velocity of the target.

If the lidars 100, 200 of FIGS. 1 and 2 are directed at a rotating object at an angle, $\alpha$, relative to the plane of rotation or spin, a component of the rotational velocity lies in the axis of the lidar beam giving rise to a Doppler frequency shift. The bandwidth of the Doppler spectrum is proportional to the width of the optical beam's "footprint" on the rotating surface. By controlling or manipulating beam geometry and the orientation of the optical footprint intercepting the rotating surface, it is possible to determine the rotational velocity from the Doppler bandwidth by a simple inverse proportional relationship. An extremely compact, standoff velocity sensor can then be configured.

Figure 4B:
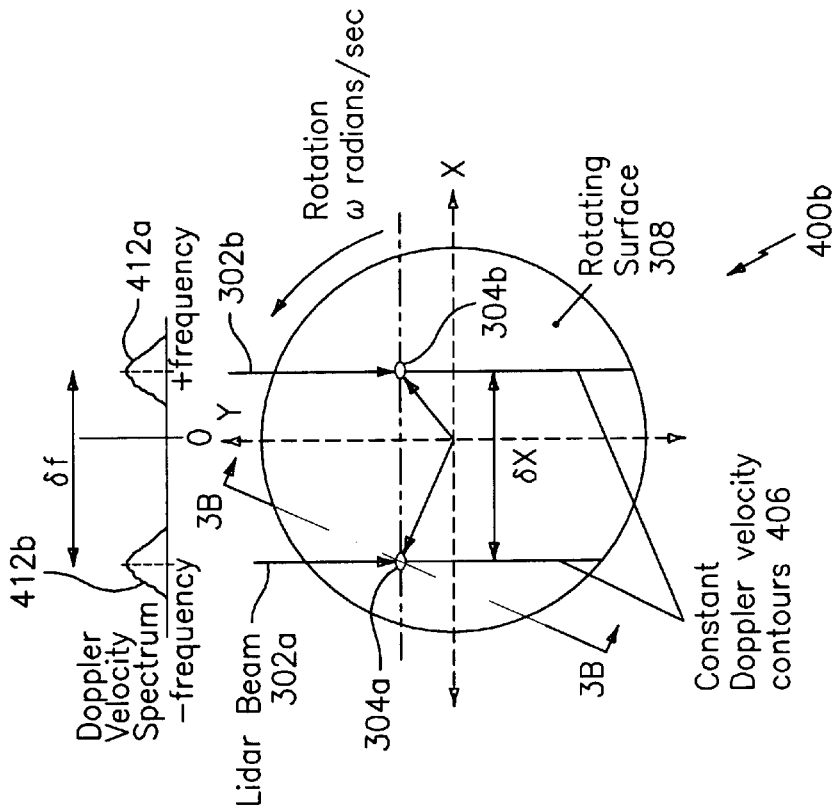
FIG. 4B is a diagrammatic representation of the geometry of constant axial beam vector velocity for a dual beam Doppler spectrum.
Figure 4A:
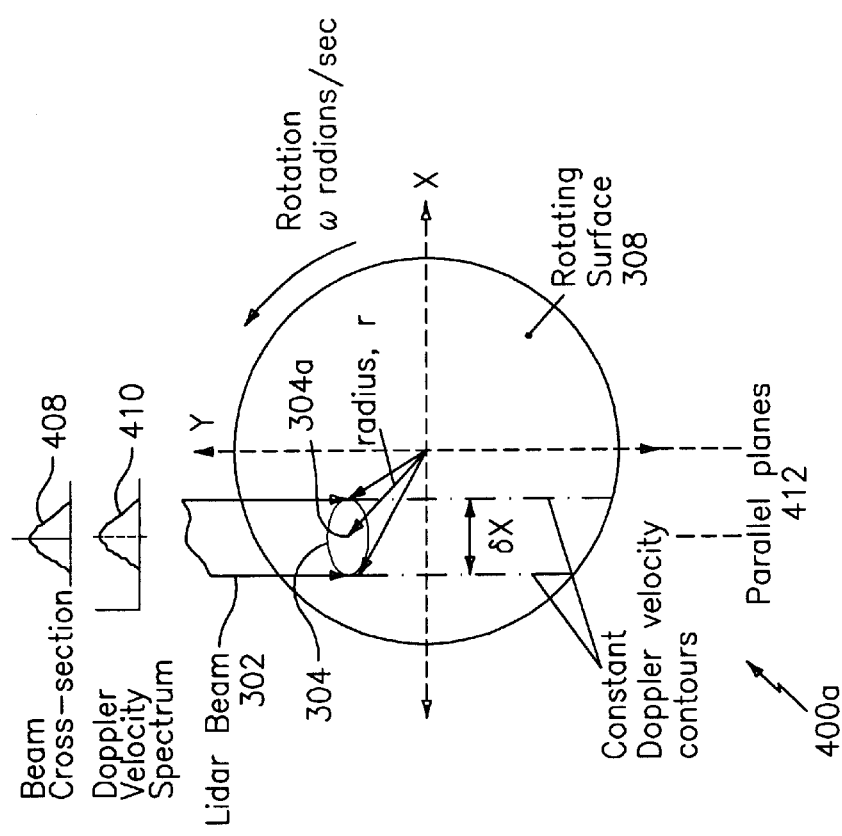
FIG. 4A is a diagrammatic representation of the geometry of constant axial beam vector velocity for a single beam Doppler spectrum.

The beam intercept geometry to be utilized is indicated in FIGS. 3A and 3B for a single beam system. In FIGS. 3A and 3B, the lidar beam 302 intercepts an object 306 constrained to rotate about a single axis 312 by any force or mechanism (e.g. motor shaft, rifled projectile, etc.). With a circularly symmetric beam, the beam 302 can intercept the object 306 at any fixed angle, $\alpha$, and at any point (depending on optical access) such that a plane containing the beam 302 and a normal 314 to the surface 308 of the object 306 forms an intercept plane parallel to the plane formed by a tangent to the object's circumference and a normal 314 to the surface of the object 306. The depression angle $\alpha$, or angle of intercept, is then defined in the plane of intercept as the angle between the rotating surface 308 and the lidar beam 302. From simple geometric considerations it may be shown that the lidar beam 302 forms an elliptical intercept 304 in the rotation plane as shown in FIG. 4A. Also, as illustrated in FIG. 4A, it can be shown with relatively simple geometry and trigonometry that equal velocity contour lines 404, perpendicular to the major axis of the illumination ellipse 304, exist in the plane of rotation 308 such that the vector velocity components 310 in the axis of the lidar beam 302 are the same anywhere along the contour lines. Such contour lines 404, 406 are shown in FIG. 4A. Likewise equal velocity contour lines 404, 406, parallel to the major axis of the illumination ellipse 304, exist in the plane of rotation such that the vector velocity components orthogonal to the lidar beam 302 are the same anywhere along those lines 404, 406. The velocity components orthogonal to the lidar beam 302 do not engender a Doppler shift to the incoming radiation. The velocity components in the axis of the lidar beam 302 result in a Doppler frequency shift in the axis of the lidar beam 302. The exact center frequency of the Doppler shift is dependent on the radial distance from the center of rotation 308a and the angular orientation, $\alpha$, of the illumination ellipse 304. However, the bandwidth of the Doppler frequency-shifted signal, caused by the spread-out nature of the illumination ellipse 304 can be shown to be proportional to the bandwidth of the laser source, the surface roughness of the rotating object 308 and the width of the major axis of the illumination ellipse 304. The bandwidth due to the width of the lidar beam 302 can be calculated as:

$$\delta f = -2\omega \delta X \cos(\alpha)$$

where $\delta f$ is the Doppler spectral bandwidth contribution due to the rotational velocity, $\omega$ is the rotational velocity in radians per second, $\alpha$ is the lidar beam intercept angle, $\delta X$ is the width of the lidar beam 302 equal to the length of the major axis of the illumination ellipse 304.

The Doppler spectral bandwidth is the same regardless of where on the rotating plane the beam intercept occurs. However, the algebraic sign of the Doppler frequency shift can change as a result of the intercept geometry and the size of the beam footprint (illumination ellipse 304). Consequently under some circumstances the Doppler spectrum can contain positive and negative Doppler shifted frequencies. Furthermore, if the illumination ellipse 304 includes the center of rotation, the Doppler spectrum will end up folded around the zero frequency. This will not allow the bandwidth to be properly detected without other considerations, as the frequency spectrum becomes folded on itself. This effect can be eliminated, for example, by not allowing the beam intercept to include the center of rotation 308a, providing for sensing negative frequencies as in the offset homodyne schematic of FIG. 1.

With the system of FIG. 1, the rotational sense may be determined in addition to the rotational velocity as a result of the offset provided by the AO cell 142. Before discussing the latter condition, several things should be considered. As noted above, the bandwidth of the Doppler spectrum is affected by the bandwidth of the source of radiation and the surface roughness of the rotating surface 308. The bandwidth of the source sets the velocity resolution limit of the system along with the geometry of the beam intercept. Under most circumstances this will not pose a measurement limitation, i.e. the rotational velocity will dominate the spectrum for even slow rotation rates. The roughness of the rotating surface however can dominate the spectrum or introduce excessive frequency noise under extreme roughness conditions. However, the roughness would have to approach a magnitude greater than the product of the trigonometric sin of the angle of intercept and the radial distance, r, of the beam center 304a from the center of rotation 308a over the entire surface of the object 308. As most measurement scenarios to which this technique would be applied are associated with machined surfaces, the roughness factor can be mitigated or generally ignored. In particular, if the rotating surface contains a wedge angle, the intercept angle can be changed to include this angle for the velocity calculation, or the mechanical fixtures, which establish the measurement geometry, may be appropriately compensated. Note also that the lidar concept includes the assumption that the light is returned to the lidar collection aperture via a scattering or reflection process. For the system described above to function, the lidar beam 302 must hit the rotating surface 308 at an angle such that the normal specular (mirror) reflection does not return light to the collection aperture 114, 214. Hence the system depends on a diffusely reflecting surface. Unless the surface 308 is in fact a high quality mirror, all surfaces will diffusely reflect some light back to the collection aperture 114, 214. If insufficient signal exists within the dynamic range of the processing electronics, it is a relatively easy task to increase the signal magnitude with a wide variety of techniques. For most surfaces, this is an unlikely problem.

Figure 5:
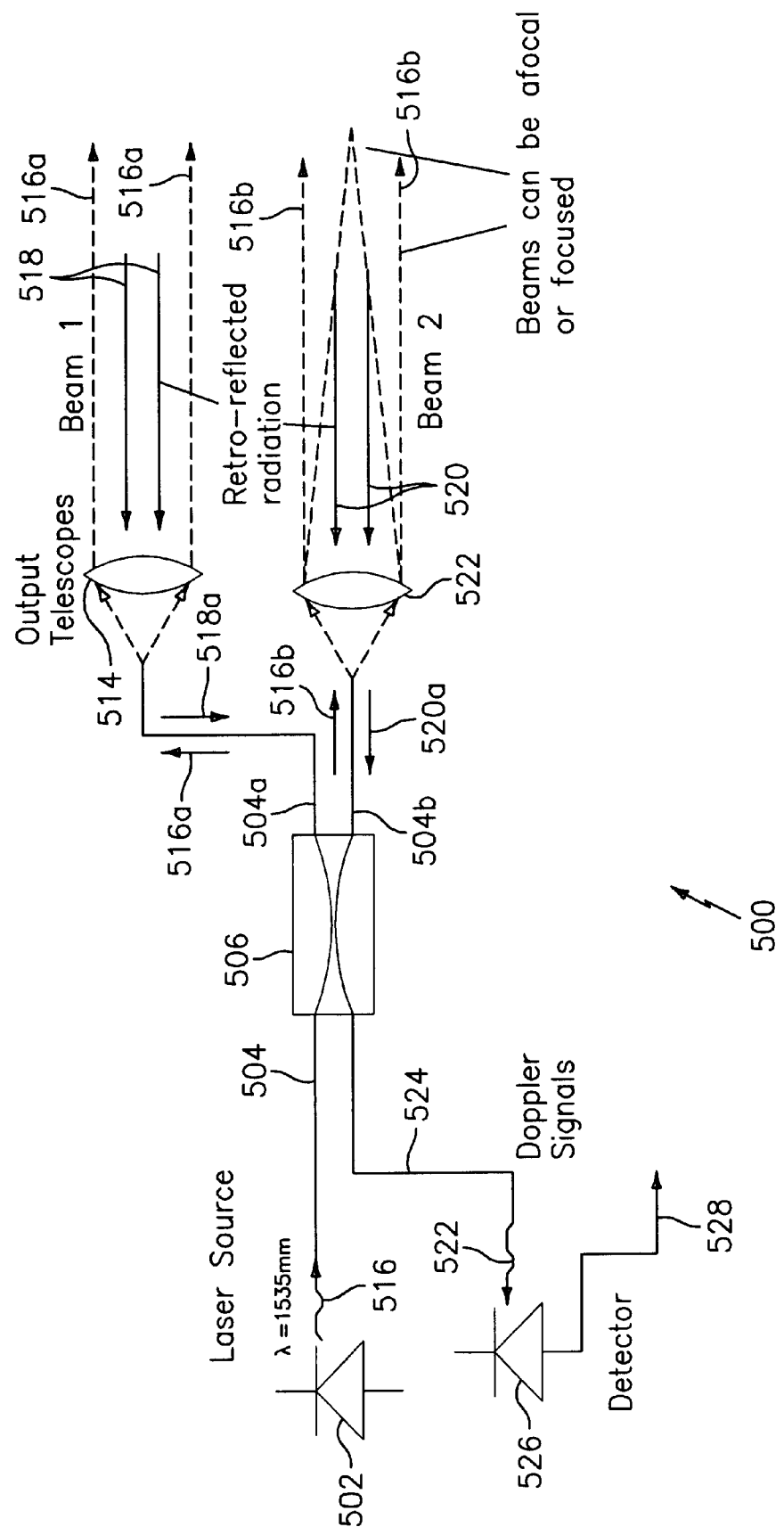
FIG. 5 is a schematic representation of a two beam lidar.

The concept as described has shown that the "bandwidth" of the Doppler spectrum is proportional to the "width" of the illuminating lidar beam 302 for a circularly symmetric beam at any intercept geometry. Lidar source beams typically have a Gaussian intensity distribution and will therefore define a Gaussian Doppler frequency spectrum. In practice, working with a Gaussian bandwidth is more difficult than necessary. The geometry of the lidar beam 302 may be modified with cylindrical lenses and spatial apodization to generate "top hat" or rectangular beam profiles such that the intensity distribution is essentially rectangular in the rotation plane. In this case the geometry of intercept must be restricted to orthogonal orientations relative to the equal velocity contours 404, but the spectrum may be processed without excessive difficulty. Alternatively, two lidar beams 302a, 302b may be used as illustrated in FIG. 4B and FIG. 5. The geometrical constraints on the beam geometry only require that the normal between the two beams lie in the plane of rotation. In FIG. 5, the local oscillator signal can either be suppressed by the balanced coupler 506 or can be generated from the Fresnel reflection at the end of either fiber 504a or 504b, reflection from the other fiber being removed with an appropriate anti-reflection coating. In the former case, the two Doppler spectrums interfere with each other, generating a difference frequency that is proportional to the separation distance δS of the two beams 302a, 302b and the rotational velocity. In the latter case, two Doppler spectrums are generated with the separation between the two center frequencies likewise having the same proportionality to separation distance and rotational velocity.

In another degree of freedom, the two beams 302a, 302b can be generated from different laser sources and processed separately or, after optical combining be processed by the same detector. Two wavelengths, such as represented by two laser diodes separated by the normal telecommunications channel spacing, are not mutually coherent, so will only interfere with homodyne versions of themselves with this kind of spacing. Hence, the local oscillator signals may be used simultaneously on a single detector to generate enhanced spectra or to enhance rotation direction sensing schemes.

The offset homodyne system 100 of FIG. 1 may be modified to generate two beams as shown in FIG. 5, in order to eliminate geometric restrictions associated with the sense of the Doppler (previously discussed). Note that in the two beam concepts, the need for large footprint in the beam is eliminated and the beams can actually be brought to a focus on the rotating surface. This allows extremely small rotating surfaces to be addressed with this technique. The beam geometry, relative to the plane of rotation, can be appropriately constrained by the mechanical design of the sensing system or compensated by electronic sensors (clinometers). In measurements of projectile velocity, a rigid alignment with the projectile is maintained with a mechanical fixture held in rigid alignment with the projectile dynamically constrained flight path.

Figure 6:
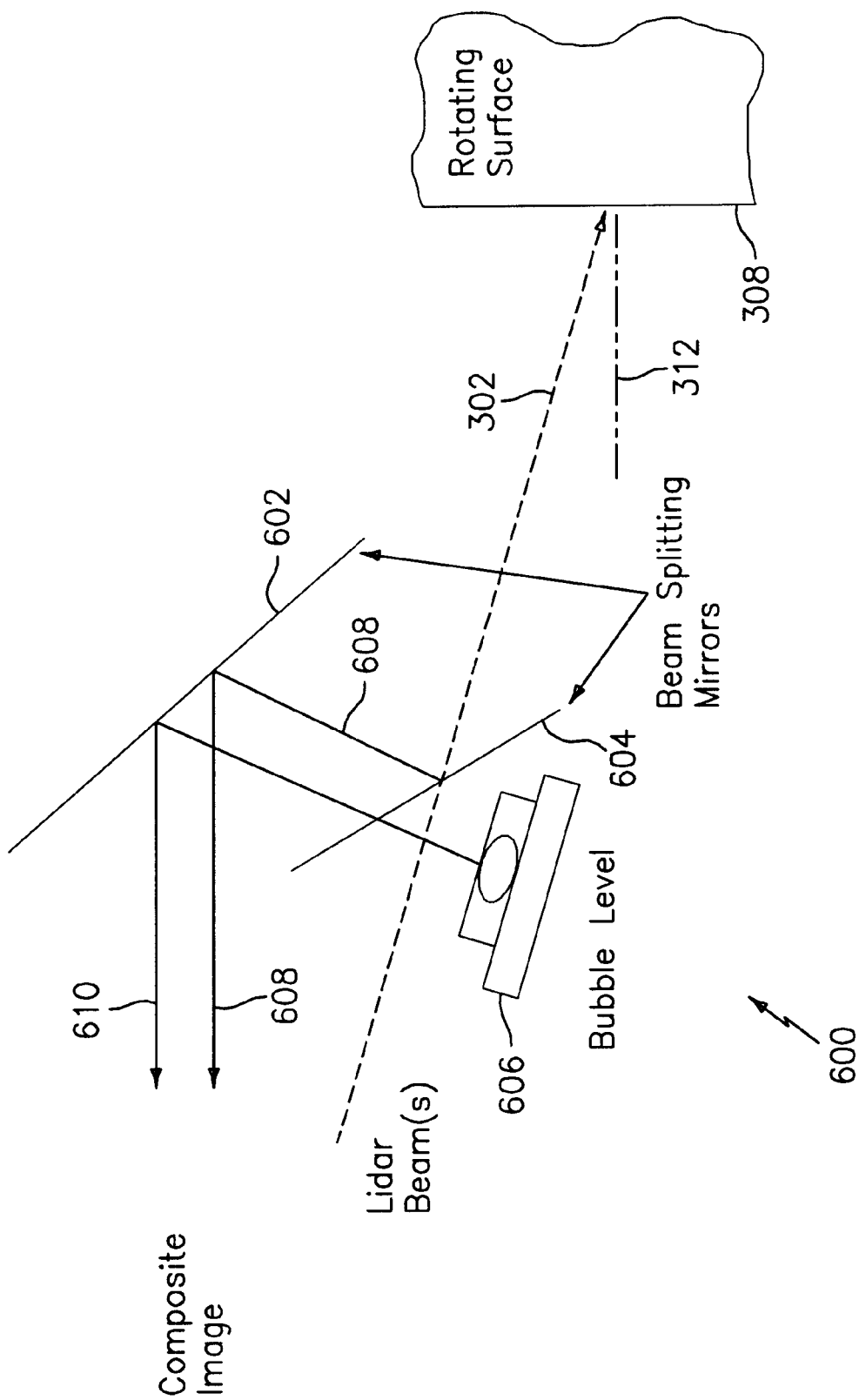
FIG. 6 is a diagrammatic representation of a visual optical alignment fixture for a hand held tachometer.

FIG. 6 shows an opto-mechanical diagram that would be appropriate for a hand held sensor used as a portable optical tachometer for interrogation of rotating shafts. In this case alignment can be done simply with visual alignment using the bubble level 606 to stabilize the plane of intercept, with or without visible alignment beams as described below. It should also be noted that single mode fiber couplers such as wavelength division multiplexers, may be designed and an optical system configured to transmit widely disparate optical wavelengths simultaneously. In this manner, visible alignment beams may be co-propagated with the optical sensing beams to aid in locating the sense beam(s) on the rotation surface 308. This factor stems from the cyclic coupling behavior associated with coupled waveguides and may be used to implement many auxiliary functions in both visible and IR wavelengths. Configuring the sensor with optical fibers or integrated optics, extremely compact, robust instruments, systems or individual sensors may be configured for a wide variety of functional utilizations and technological implementations.

Thus, based upon the foregoing description, a method and apparatus for determining the rotational velocity of an object is disclosed. While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting the claims.

What is claimed is:

1. A method of determining a rotational velocity of an object, the method comprising:
    directing at least one beam of light at the object creating thereby an illumination area on a surface of the object;
    sensing at least one beam of light reflected or backscattered from the object;
    determining a Doppler spectral bandwidth of the sensed beam of light reflected or backscattered from the object;
    determining a width of the illumination area;
    determining an angle at which the at least one beam of light directed at the object intercepts the rotating object; and
    calculating the rotational velocity of the object based upon the equation:

$$\delta f = -2\omega\delta X \cos(\alpha),$$

where δf is the Doppler spectral bandwidth contribution due to the rotational velocity of the object, ω is the rotational velocity of the object in radians per second, α is the angle at which the beam of light intercepts the object and δX is the width of the beam along a major axis of the illumination area.

2. The method as set forth in claim 1 wherein the Doppler bandwidth or separation frequencies are rotationally and positionally invariant after the angle at which the beam of light directed at the object intercepts the surface of the rotating object is fixed.

3. A Doppler rotational velocity sensor system comprising:
    a light source generating an optical signal at a prescribed wavelength;
    a signal multiplexing device receptive of the optical signal from the light source and operative thereby to provide as output a beam of light directed to a diffusely reflecting target at a prescribed angular orientation and further operative thereby to accept as input thereto Doppler shifted radiation reflected or backscattered from the target;
    wherein the beam of light subtends a prescribed width of an intersecting illumination area on the surface of the target; and
    a detector receptive of the Doppler shifted radiation and a Fresnel reflection of the beam of light and operative thereby to provide as output a signal indicative of the rotational velocity of the target.

4. The sensor system as set forth in claim 3 further comprising:
   a signal amplifier receptive of the signal indicative of the rotational velocity of the target and operative thereby to provide as output an amplified rotational velocity signal; and
   a spectral processor receptive of the amplified rotational velocity signal and operative thereby to provide as output a signal indicative of the Doppler velocity spectrum.

5. The sensor system as set forth in claim 3 further comprising a telescope for launching the beam of light to the target and receiving the Doppler shifted radiation.

6. The sensor system as set forth in claim 5 further comprising an optical fiber system interconnecting the light source, the signal multiplexing device, the detector, the signal amplifier, the spectral processor and the telescope and operative to convey the optical signal, the output beam of light, the Doppler shifted radiation, the Fresnel reflection, the rotational velocity signal, the amplified rotational velocity signal and the signal indicative of the Doppler velocity spectrum therealong.

7. A Doppler rotational velocity sensor system comprising:
   a light source generating an optical signal at a prescribed wavelength;
   a coupling device receptive of the optical signal from the light source and operative thereby to divide the optical signal and provide as output a local oscillator signal and a transmitted beam of light;
   a circulator receptive of the transmitted beam of light from the coupling device and operative thereby to direct the transmitted beam of light to a diffusely reflecting target at a prescribed angular orientation and further operative thereby to accept as input thereto Doppler shifted radiation reflected or backscattered from the target;
   wherein the transmitted beam of light subtends a prescribed width of an intersecting illumination area on the surface of the target;
   a frequency modulator receptive of the local oscillator signal from the coupling device and operative thereby to provide as output a frequency offset local oscillator signal;
   a signal combiner receptive of the frequency offset local oscillator signal from the frequency modulator and the Doppler shifted radiation from the circulator providing thereby a Doppler optical signal; and
   a detector receptive of the Doppler optical signal from the signal combiner providing thereby as output an in phase signal indicative of the rotational velocity of the target.

8. The sensor system as set forth in claim 7 further comprising:
   a signal amplifier receptive of the signal indicative of the rotational velocity of the target and operative thereby to provide as output an amplified rotational velocity signal; and
   a spectral processor receptive of the amplified rotational velocity signal and operative thereby to provide as output a signal indicative of the Doppler velocity spectrum.

9. The sensor system as set forth in claim 7 further comprising a telescope for launching the beam of light to the target and receiving the Doppler shifted radiation.

10. The sensor system as set forth in claim 9 further comprising an optical fiber system interconnecting the light source, the coupling device, the circulator, the detector, the frequency modulator, the signal combiner, the signal amplifier, the spectral processor and the telescope and operative to convey the optical signal, the output beam of light, the local oscillator signal, the frequency offset local oscillator signal, the Doppler shifted radiation, the Doppler optical signal, the rotational velocity signal, the amplified rotational velocity signal and the signal indicative of the Doppler velocity spectrum therealong.

11. A method of determining a rotational velocity of an object having a diffusely reflecting surface, the method comprising:
   directing at least one beam of light at the object creating thereby an illumination area on a surface of the object;
   sensing at least one beam of light reflected or backscattered from the object;
   determining a Doppler spectral bandwidth of the sensed beam of light reflected or backscattered from the object;
   determining a width of the illumination area;
   determining an angle at which the at least one beam of light directed at the object intercepts the rotating object; and
   calculating the rotational velocity of the object based upon the equation:

$$\delta f = -2\omega \delta X \cos(\alpha),$$

where $\delta f$ is the Doppler spectral bandwidth contribution due to the rotational velocity of the object, $\omega$ is the rotational velocity of the object in radians per second, $\alpha$ is the angle at which the beam of light intercepts the object and $\delta X$ is the width of the beam along a major axis of the illumination area.

* * * * *